UNITED STATES PATENT OFFICE.

JAMES ALBERT DEUTHER, OF BUFFALO, NEW YORK.

PROCESS OF PRODUCING ETHYLENE GAS.

SPECIFICATION forming part of Letters Patent No. 647,559, dated April 17, 1900.

Application filed November 14, 1895. Serial No. 568,942. (No specimens.)

*To all whom it may concern:*

Be it known that I, JAMES ALBERT DEUTHER, a citizen of the United States, residing at Buffalo, in the county of Erie and State of New York, have invented certain new and useful Improvements in the Manufacture of Ethylene Gas; and I do hereby declare the following to be a full, clear, and exact description of the invention, such as will enable others skilled in the art to which it appertains to make and use the same.

This invention relates to a novel and improved method in the production or manufacture of ethylene or olefiant gas $C_2H_4$, as expressed.

My improvements are embodied in a simple and direct process by which the expense heretofore incurred in the production of the gas is greatly diminished. Heretofore one method of producing this gas was in treating the red precipitate of cuprous acetylene with metallic zinc in a solution of ammonia. In this way nascent hydrogen is produced and ethylene or olefiant gas is formed.

My invention is embodied in the novel and radically-new process in so treating any one of the metals—calcium, barium, strontium, or analogous metals—with a sufficiency of carbon that when this compound is placed in water the gas $C_2H_4$ is produced.

Briefly stated, my invention is the novel one of creating ethylene gas in a pure state by producing nascent hydrogen free from objectionable impurities in the presence of or simultaneously with $C_2H_2$. Such has never heretofore been obtained to my knowledge. In the present formula I will instance the production of this gas by the use of calcium. Moreover, by making a compound with an excess or sufficiency of Ca in conjunction with $CaC_2$ the reaction produced is as follows:

$$Ca + CaC_2 + 2(H_2O) = 2(CaO) + C_2H_4,$$

or this may be otherwise expressed in a diagram form thus:

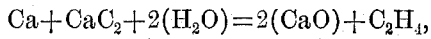
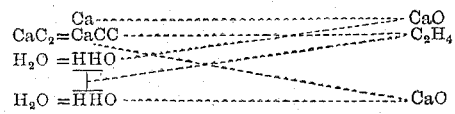

From the affinity of the oxygen for the calcium arises $2(CaO)$, while the carbon and hydrogen unite, these latter appearing in the form of ethylene gas, expressed by the well-known formula $C_2H_4$.

In this specification I do not refer to the production of calcium in an isolated state—that is, calcium unalloyed with other substance. Take the equation $$CaO(lime) + C(carbon) = Ca + CO;$$

that is, metallic calcium and carbon monoxid. I have found that while this theoretical reaction may not be commercially carried out in the electric furnace, the following reaction does take place. When a mixture of lime and carbon is fused in the electric furnace, the quantity of carbon is in excess of that required to reduce the lime by combining the oxygen of the lime, yet of such amount as to convert a portion only, and not the whole of said reduced lime, into calcium carbid. Then the balance of said reduced lime exists as calcium combined with calcium carbid, forming an alloy represented by the equation $$Ca(calcium) + CaC_2(calcium\ carbid.)$$

Comparing the production of calcium carbid and calcium alloys, thirty-six pounds of carbon with fifty-six pounds of lime may be represented by the following equation:

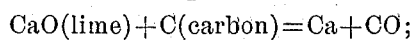
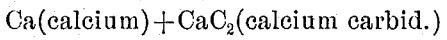
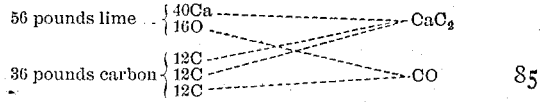

producing sixty-four pounds of calcium carbid and twenty-eight pounds of carbon monoxid. Likewise the fusion of one hundred and twelve pounds of lime and forty-eight pounds of carbon may be represented by the following equation, producing the calcium alloy $Ca + CaC_2$:

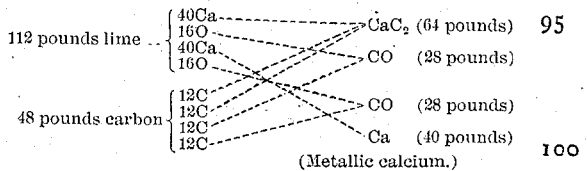

The above makes plain that I do not resort to the use of isolated metallic calcium, but of a calcium alloyed with calcium carbid and which is readily produced in the electric furnace.

What I claim is—

The process of producing ethylene gas, $C_2H_4$, which consists in decomposing water, $H_2O$, in the presence of a compound consisting of a compound such as described, composed of a metal capable of decomposing water, and the carbid of such metal whereby the nascent hydrogen transforms the generated acetylene into ethylene.

In testimony whereof I affix my signature in presence of two witnesses.

JAMES ALBERT DEUTHER.

Witnesses:
JOHN R. WALSH,
H. E. LODGE.